Nov. 12, 1968  C. K. N. PATEL  3,411,105
POLYATOMIC GASEOUS INFRARED OPTICAL MASER
Filed March 15, 1963  4 Sheets-Sheet 1

INVENTOR
C. K. N. PATEL
BY
ATTORNEY

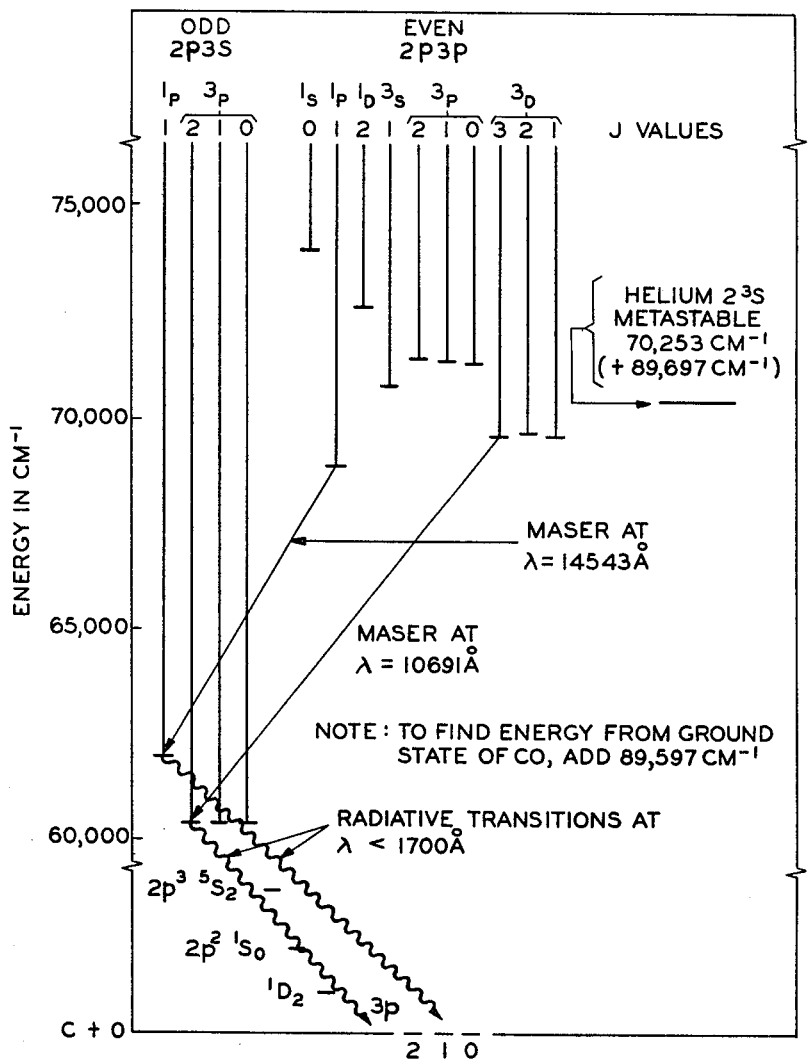

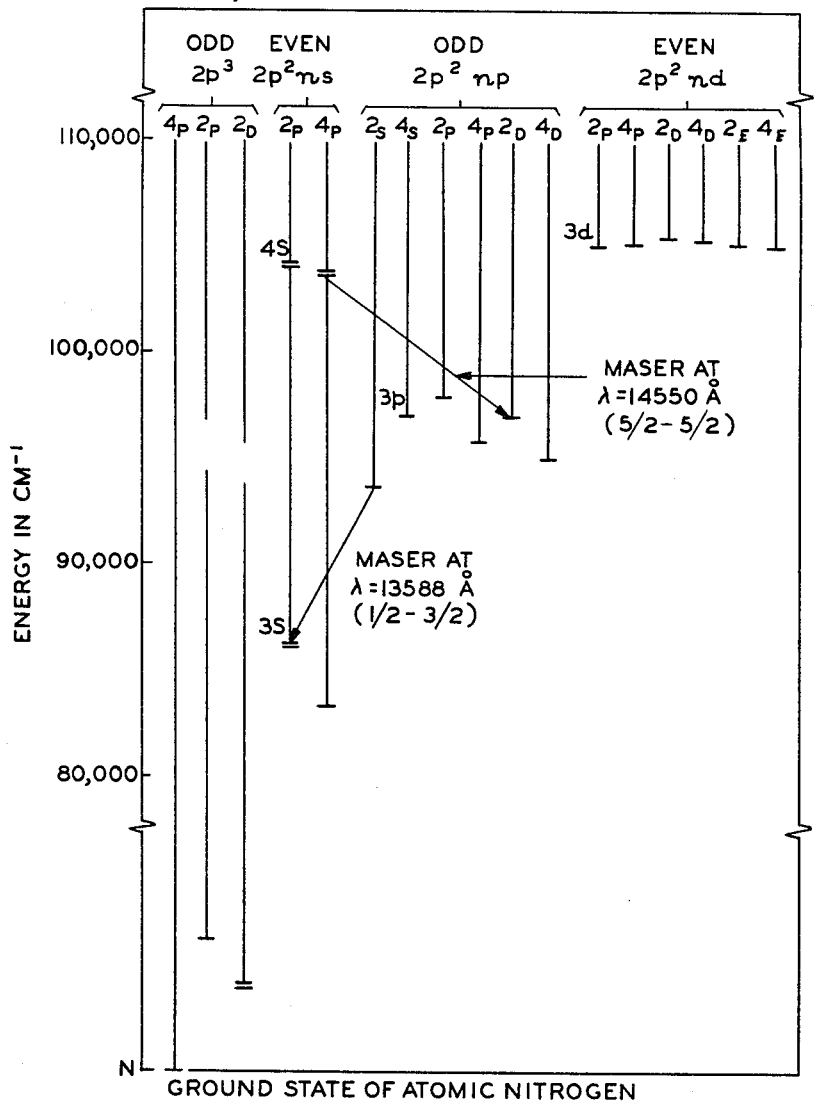

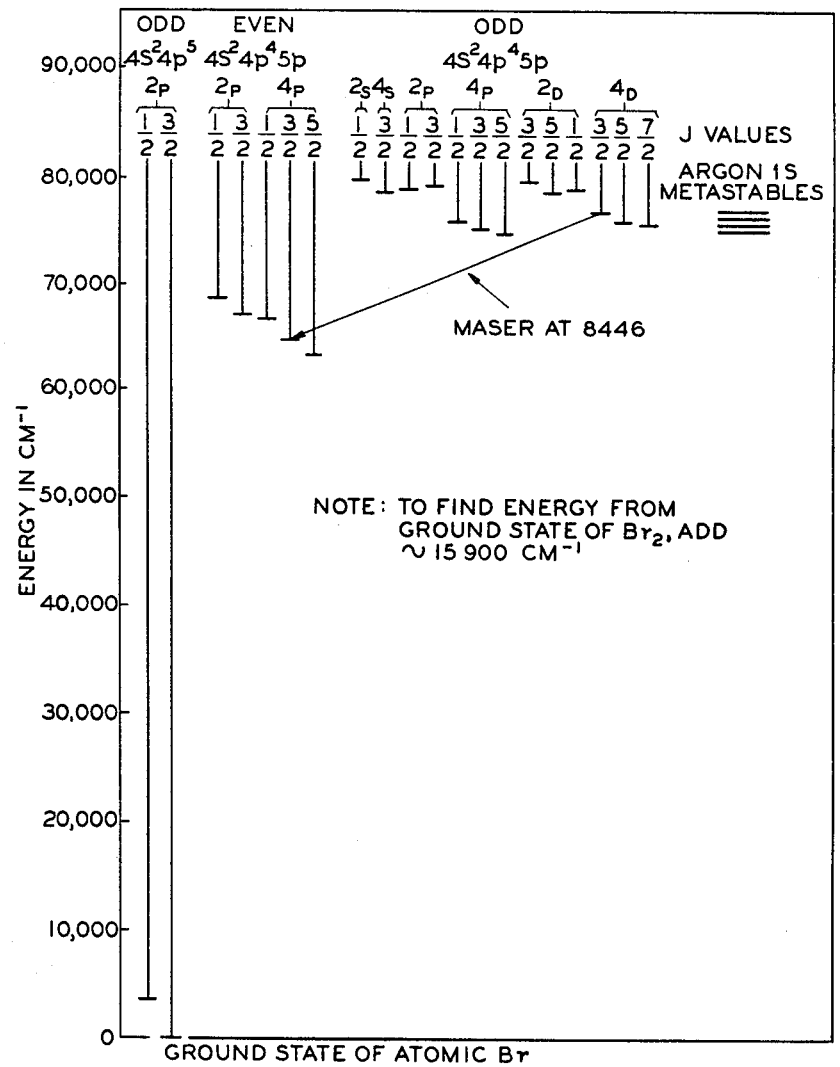

United States Patent Office 3,411,105
Patented Nov. 12, 1968

3,411,105
POLYATOMIC GASEOUS INFRARED
OPTICAL MASER
Chandra K. N. Patel, Summit, N.J., assignor to Bell Telephone Laboratories, Incorporated, New York, N.Y., a corporation of New York
Filed Mar. 15, 1963, Ser. No. 265,529
5 Claims. (Cl. 331—94.5)

This invention relates to optical masers and, more particularly, to optical masers employing gaseous active media.

The recent development of coherent light amplifiers and oscillators, now generally referred to as "optical masers" or "lasers" has made feasible a host of new uses and applications of electromagnetic wave energy in the optical portion of the spectrum. Light waves produced by such devices can be very sharply focused to produce energy densities suitable for welding, cutting, drilling and similar purposes. Furthermore, the high degree of monochromaticity obtainable from an optical maser makes it a useful tool for spectroscopic investigations as well as for stimulating various types of chemical and physical reactions. Among the most promising applications of coherent light are those in the field of communications where the optical spectrum represents virtually unlimited bandwidth and information carrying capacity. In addition, the directionality of optical maser beams greatly mitigates many problems of interference and security of communications channels.

For communications and other applications it is advantageous to have optical masers operable at many different wavelengths in the light spectrum, which is deemed to include infrared, visible and ultraviolet energy. As the wavelength emitted by any particular energy transition in a laser medium is tunable only over a small portion of the spectrum, it is important to provide a number of materials adapted for use as active laser media at various light frequencies. A great amount of research has recently been directed to the discovery of such materials and a number, particularly in the solid state, have been found. Furthermore, especially for communications use, it is important that laser media be provided which are adapted to continuous wave operation. In general, such media are those characterized by three or more energy levels, at least two of which are optically connected. A further communications requirement is low noise, a feature which, due to the complex structure and emission characteristics of solids, appeals more readily achievable with gaseous optical masers.

In order for a material to be useful as a negative temperature medium in an optical maser, it is essential that it be "pumpable" i.e., that there be some way of increasing the population of the upper level of an optically connected pair of levels, designated the signal transition, to the point where it equals or exceeds the population of the lower level of the pair. Coherent emission is then obtained by stimulating the return of the population to an equilibrium distribution. In one type of laser the inverted population condition is produced by optical pumping with light of a higher frequency than that of the signal transition. Atoms of the active medium are excited by the resonant absorption of photons having energies corresponding to the separation between a pair of energy levels. Other resonant high frequency pumping schemes are also known. Unfortunately, many are relatively limited in their efficiency because of the requirement that the pump energy fall within a certain frequency range. Ordinary sources of light energy, however, have outputs which normally extend over a much broader spectral range. Much light produced by such a source, therefore, may be useless for pumping a particular medium.

Another pumping technique which has proven useful in the case of certain gaseous laser media is electron bombardment. Optical maser action has been produced by this means in the noble gases helium, neon, argon, krypton and xenon. In a typical noble gas laser, the noble gas atoms are excited by collisions with free electrons in a gaseous discharge. In order for a population inversion to result from electron-atom collisions, it is essential that the active gas have a heavily populated energy state with a large cross section for excitation to the upper level of the signal transition or to a higher level which relaxes or decays thereto. It is also necessary that various competing effects produced by the interaction of electrons with the gas be maintained at a relatively low level. Thus, pumping of gas lasers by electron-atom collisions requires careful selection of the active gas as well as precise control of environment factors such as pressure and intensity of the discharge. In many cases, moreover, special measures must be taken to inhibit interactions which compete with the desired one.

The selectivity of excitation in a gaseous discharge may be enhanced by mixing the active gas with an auxiliary gas which has a metastable energy state matching the upper maser level. The auxiliary gas is then excited to its metastable state and, through resonant interaction in inelastic atom-atom collisions, the excitation is transferred to the active gas. This process, which made possible the first continuous wave optical maser, is disclosed in copending application Ser. No. 277,651, filed May 2, 1963, by Ali Javan, as a continuation in part of copending application Ser. No. 816,276, filed May 27, 1959, by Ali Javan and now abandoned. This application is assigned to the assignee hereof. In a variation of the technique, the auxiliary gas serves to populate a metastable state of the active gas which has a large cross section for excitation to a desired upper level. Although it is applicable to all combinations of gases which satisfy the particular energy level criteria, the atom-atom collision process is limited by the close coincidence required of the energy levels between which the excitation transfer occurs. It appears that the number of such coincidences which exist in nature is insufficient to cover all parts of the light spectrum as is desired.

In the copending application of W. R. Bennett, Jr., and A. Javan, Ser. No. 202,872, filed June 15, 1962, now U.S. Patent No. 3,159,707, and assigned to the assignee hereof, it is shown how the limitation imposed by the relative rarity of pairs of gasses having closely matched energy levels may be avoided. This is accomplished by utilizing as the active medium a molecular gas, such as oxygen, characterized by at least one repulsive excited energy state which terminates in an upper level of a component atom. Pumping of the active gas is accomplished by dissociative excitation transfer from excited metastable particles of an auxiliary gas. Typically, such transfer is possible within a relatively broad energy range.

I have discovered a number of molecular gases and gaseous mixtures in which optical maser action may be produced. In these gases, which have not previously been known to be suitable for such purposes, a population inversion is produced among the energy levels of an atomic component of a gaseous molecule. Energy is transferred to the active atoms by processes involving molecular dissociation. In this manner, coherent optical emission has been obtained from elements which when uncombined typically are not available in the gaseous phase at vapor pressures high enough to permit satisfactory use as optical maser media. Still other molecular gases have made feasible optical maser action with elements which when uncombined are highly corrosive or otherwise difficult to handle.

Among the features of the invention are gaseous optical masers in which the active medium comprises carbon monoxide (CO), carbon dioxide ($CO_2$), nitric oxide (NO), nitrous oxide ($N_2O$), bromine ($Br_2$), and sulfur hexafluoride ($SF_6$). Other suitable gases are cyanogen ($C_2N_2$), hydrogen chloride (HCL), hydrogen bromide (HBr), silicon tetrafluoride ($SiF_4$), chlorine ($CL_2$), mercury ($Hg_2$), sulfur dioxide ($SO_2$) and ammonia ($NH_3$).

The objects and features of the invention may be thoroughly understood from the following more detailed discussion taken in conjunction with the accompanying drawing in which:

FIG. 2 is a diagram of portions of the energy level systems of carbon, oxygen, and helium—helpful in understanding optical maser action of the carbon atoms in CO;

FIG. 3 is a diagram of a portion of the energy level system of nitrogen; and

FIG. 4 is a diagram of a portion of the energy level system of bromine.

Figure 1:
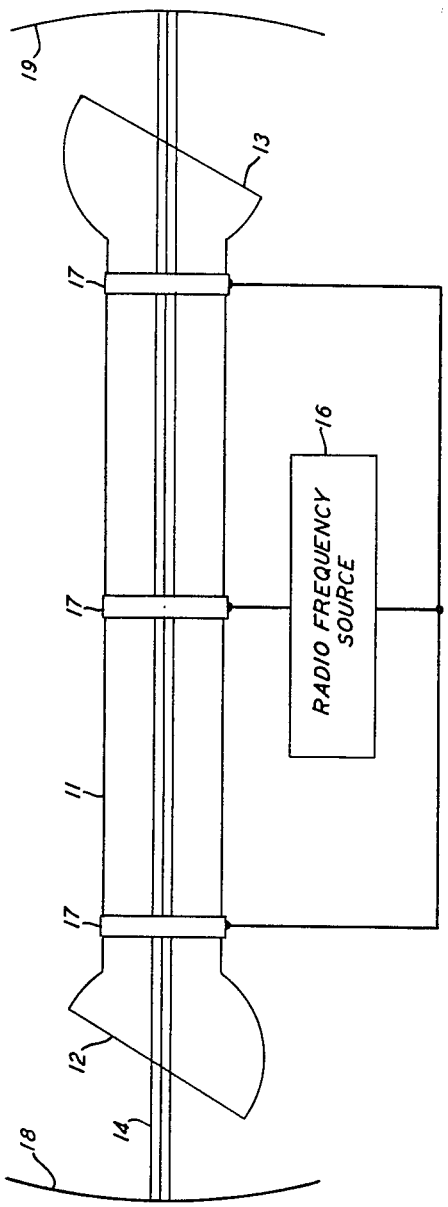
FIG. 1 depicts an optical maser of a type suitable for practicing the invention.

A coherent light generator or amplifier may comprise apparatus as illustrated in FIG. 1. There is shown an elongated quartz tube 11 defining an enclosed space for containing a gaseous active medium as taught herein. A light beam path through the tube 11 is defined by transparent windows 12 and 13, which are inclined at Brewster's angle to the path of light beam 14. By placing the windows at Brewster's angle light polarized in the plane of incidence is enabled to be transmitted without reflection. Radio frequency energy, supplied by a source 16, is applied to the gaseous medium by means of electrodes 17 which in the illustrated embodiment are external to the tube 11. The use of external electrodes avoids contamination of the gas mixture as well as eliminating fouling of the windows 12 and 13 by sputtering. The frequency and intensity of the radio frequency energy are appropriate to produce an electron discharge in the gaseous medium. In the optical masers whose operation is described below, the tube 11 was two meters long and had an inside diameter of about five millimeters. The active medium was excited by pump energy at twenty-seven megacycles per second.

If the device shown in FIG. 1 is to be used as a source or oscillator, a pair of reflectors 18 and 19 may be positioned adjacent the windows 12 and 13 thereby introducing a positive feedback loop into the amplifying path. The reflectors 18 and 19, which may be, for example, either flat or curved as taught in United States Patent No. 3,055,257, issued Sept. 25, 1962, to Boyd, Fox and Li. In the drawing, the reflector 19 is partially transmissive to permit the coherent light to be abstracted from the optical cavity resonator for utilization as desired. The device may be used as a coherent light amplifier either with or without reflectors.

FIG. 2 depicts portions of the energy level systems of carbon and helium—helpful in understanding optical maser action of carbon in CO. The horizontal base line represents the energy of carbon atoms in the ground state, while the horizontal line at the top of the figure represents the ionization potential of carbon. Optical maser action has been achieved in mixtures of CO with helium or neon at wavelengths of 10,691 A. and 14,543 A. corresponding to the transitions of the carbon atom shown in FIG. 2. Such action has also been observed at the following wavelengths which are not shown in FIG. 2: 20,650 A. ($5d^1D_2^0$–$4_p{}^3P_2$); 34,060 A. ($4d^1D_2^0$–$4_p{}^1P_1$); 35,160 A. ($6d^3P_2^0$–$5p^3D_3$); and 55,971 A. ($4p^3S_1$–$3d^3P_1^0$). The partial pressure of CO in the tube was typically in the range from .008–.01 torr; that of He was typically in the range from 1.8–2 torr, and that of Ne was about 1 torr.

In the CO-He mixture, it is believed that free electrons produced by the radio frequency field collide with CO molecules and ground state He atoms. The latter have a large cross section forexcitation to the upper maser level which, in the case of the $2^3S_1$ level, lies about 70,253 cm.$^{-1}$ above the ground state of carbon and about 159,850 cm.$^{-1}$ above the ground state of CO. The He metastables collide with the CO molecules, which have a dissociation energy of about 89,597 cm.$^{-1}$, causing them to dissociated into carbon atoms in excited states and ground state oxygen atoms. The reaction may be of the form $$CO+HE^*(2^3S_1) \rightarrow C(3p^3D, 3p^1P)+O+He \quad (1)$$

where the asterisk indicates a metastable axcited atom.

Optical maser action is simultaneously produced in these gases mixtures on the $3p^3P_2$–$3s^3S_1$ transition of atomic oxygen (8446 A.). Several possible reactions are available to explain the inverted population distribution among the oxygen atoms. One is $$CO+HE^*(2^3S_1) \rightarrow O(2p^4\ ^1S_0)+C(2p^3\ ^5S_2)+He \quad (2)$$

followed by $$O(2p^4\ ^1S_0)+e+K.E. \rightarrow O(3p^3P)+e \quad (3)$$

Neon, unlike helium, has no known metastable state close to the upper maser level of the carbon atom. The reaction may take the form:

$$CO+Ne^*(1s) \rightarrow C^*(2p^3\ ^5S_2)+O+Ne \quad (4a)$$

and $$CO+Ne^*(1s) \rightarrow C+O^*(2p^4\ ^1S_0)+Ne \quad (4b)$$

followed by $$C^*(2p^3\ ^5S_2)+e+K.E. \rightarrow C(3p^3D, 3p^1P)+e \quad (5a)$$

and $$O(2p^4\ ^1S_0)+e+K.E. \rightarrow O(3p^3P)+e \quad (5b)$$

This process appears to be as efficient as the more direct excitation which occurs in the He-CO case.

In mixtures of He or Ne with NO, optical maser action occurs at wavelengths of 13,583 A. and 14,544 A. corresponding to the $$3p^2s_{1/2}^0 - 3s^2P_{3/2} \text{ and the } 4s^4P_{5/2} - 3p^2D_{5/2}^0$$

transitions, respectively. The dissociation energy of NO is generally given as either 52,324 cm.$^{-1}$ or 42,669 cm.$^{-1}$. Using the first value, a possible excitation reaction in the He mixture is:

$$NO+He^*(2^3S_1) \rightarrow N(3p^2S_{1/2}^0, 4s^4P_{5/2})+O+He \quad (6)$$

In the NO-Ne mixture the reaction might be $$NO+Ne^*(1s) \rightarrow N^*(2p^3\ ^2P^0)+O+Ne \quad (7a)$$

and $$N^*(2p^3\ ^2P^0)+e+K.E. \rightarrow N(\text{upper maser level})+e \quad (7b)$$

In mixtures of He or Ne with $CO_2$, optical maser action occurs at the above-mentioned wavelengths corresponding to transitions of atomic carbon and oxygen. When He or Ne is mixed with $N_2O$, such action is observed for the atomic nitrogen component. In addition to the fact that analysis of the excitation mechanism involves a four body collision problem, the dissociation energies of polyatomic gases are not well established. Thus, details of the process cannot be accounted for at this time.

Coherent emission has also been obtained from a discharge containing about 0.03 torr of $SF_6$, which may—but need not—be mixed with about 2.0 torr of He. Two wavelengths have been observed: 10,455 A. corresponding to the $4p^3P_2$—$4s^3S_1{}^0$ transition of atomic sulfur, and 10,628 A. corresponding to the transition $4p'^1F_3$–$4s'\ ^1D_2{}^0$ of atomic sulfur.

In a mixture containing about 0.1 torr of $Br_2$ and 1.8 torr of argon maser action takes place at four wavelengths: 8446.28 A.; 8446.38 A.; 8446.70 A.; and 8446.79 A. The transitions are not yet classified.

Optical maser action is also possible in mixtures of helium or neon with cyanogen (CN) which has a dissociation energy of about 61,301 cm.$^{-1}$. When the auxiliary gas is He, energy is preferentially transferred from helium metastable energy states to excited states of atomic nitrogen. Population inversions may thus be produced between the $2p^23p$ and $2p^23s$ sets of levels of nitrogen corresponding to a number of wavelengths in the range from about 6800 A. to about 7500 A. Transitions also exist between the $2p^23d$ and $2p^23s$ configurations of levels corresponding to wavelengths around 10,000 A.

In the Ne-CN mixture energy is transferred from neon atoms in the metastable state to the $2p3p$ configuration of levels of atomic carbon, resulting in population inversions between these levels and the $2p3s$ set of levels. Stimulated emission results at wavelengths between about 7200 A. and 11,000 A.

When a discharge is produced in a mixture of neon and dry hydrogen chloride, energy is transferred from metastable states of neon atoms to excited states of chlorine. Population inversions may thus be produced between the $4p$ and $5p$ and the $4s$ sets of levels of atomic chlorine. Stimulated emission occurs at wavelengths in the range from about 4,000 A. to about 5,000 A. Inversion of transitions corresponding to wavelengths in this range may also be produced in mixtures of chlorine gas with argon. Excitation occurs by collision transfer from metastable argon atoms to the $5p$ levels of atomic chlorine, with inversions resulting between these levels and the $4s$ levels.

In a mixture of gallium and mercury vapors, which may be maintained in the maser tube with the aid of a small oven or heater connected thereto, excitation is transferred from the $6^3P_2$ level of mercury to the $7^2P_{1/2, 3/2}$ and $6^2D_{3/2, 5/2}$ levels of gallium which are thus inverted with respect to the $5^2S_{1/2}$ and $5^2P_{1/2, 3/2}$ levels. Maser action is thus possible at about 5390 A. and about 5385 A. In addition, energy is also transferred from the $6^3P_0$ level of mercury to the $6^2S_{1/2}$ level of gallium enabling operation at about $2.2\mu$ and $2.1\mu$ corresponding to the transitions between the latter level and the $5^2P_{1/2, 3/2}$ levels.

Population inversions between the $6^2D_{3/2, 5/2}$ levels and the $7^2P_{1/2}$ and $7^2P_{3/2}$ levels of atomic thallium may be produced in a discharge utilizing TlI vapor. The upper maser level is populated by optical pumping which causes dissociation of TlI molecules. A peak pump light intensity around 1740 A. is preferable. Maser action is at $9.35\mu$ and $4.75\mu$.

Although the invention has been described with particular reference to specific embodiments, these are to be construed as illustrative only and not as limitations on its scope and spirit which includes variations and modifications within the capabilities of those skilled in the optical maser art.

What is claimed is:

1. An infrared optical maser comprising
   means forming an enclosed space,
   a gaseous mixture within said space comprising an auxiliary monatomic gas and an active polyatomic gas of unlike atoms,
   and means for supplying energy to said mixture to establish a population inversion between an optically connected pair of energy levels of said active gas, said pair of energy levels having an energy difference corresponding to an infrared wavelength to provide for stimulated emission of radiation at said infrared wavelength,
   the gaseous mixture being selected from the group consisting of:

| He-CO | Ne-CO | He-CN |
   |---|---|---|
   | He-CO$_2$ | Ne-CO$_2$ | Ne-CN |
   | He-NO | Ne-NO | Ne-HCl |
   | He-NO$_2$ | Ne-N$_2$O | He-SF$_6$; and | means disposed about said forming means for resonating said infrared radiation from said gaseous mixture whereby the stimulated emission of radiation is obtained selectively at said infrared wavelength.

2. An optical maser in accordance with claim 1 in which the gaseous mixture is He-CO.

3. An optical maser in accordance with claim 1 in which the gaseous mixture is Ne-CO.

4. An optical maser in accordance with claim 1 in which the gaseous mixture is Ne-NO.

5. An optical maser in accordance with claim 1 in which the gaseous mixture is Ne-N$_2$O.

References Cited

Boot, "Pulsed Gaseous Maser," Nature, vol. 197, No. 4863, January 1963, pp. 173–174, Q–1–N2.

JEWELL H. PEDERSEN, *Primary Examiner.*

R. L. WIBERT, *Assistant Examiner.*